United States Patent Office 3,479,306
Patented Nov. 18, 1969

3,479,306
WATER SOLUBLE EPOXY ESTERS
John C. Safranski, Jr., Midland, Mich., assignor to The Dow Chemical Company, Midland, Mich., a corporation of Delaware
No Drawing. Filed Aug. 24, 1965, Ser. No. 482,280
Int. Cl. C08g 51/72, 51/34
U.S. Cl. 260—18
9 Claims

ABSTRACT OF THE DISCLOSURE

A water soluble coating material, useful for electrodeposition, is prepared by esterifying an epoxy resin with a combination of a drying oil fatty acid and an aromatic monocarboxylic acid then reacting the unsaturated epoxy ester with an $\alpha,\beta$-unsaturated carboxylic acid followed by reaction with ammonia or an amine, then solubilized by a water soluble coupling agent such as a glycol, glycol ether or a ketone.

---

This invention relates to water soluble epoxy resins which are useful in the preparation of coatings. More particularly, the invention concerns drying oil fatty acid esters of epoxy resins reacted with maleic anhydride and ammonia to produce resins which are infinitely miscible with water in the presence of a polar solvent.

The resins which are produced according to this invention have several properties which are especially desirable in coatings. Their water solubility makes them well suited as paints owing to the convenience of being able to clean paint brushes and other applicating equipment with water as well as the elimination of the odor, fire hazard and the expense of organic solvents.

Latex paints have gained widespread popularity for the reason, in part, that they are water miscible. Latex paints typically have a low viscosity which is not satisfactory for high pigment to binder ratios. Additionally, it has been difficult to make a latex-base high gloss enamel owing to the rapid evaporation of the continuous aqueous phase in the colloidal system which does not leave a wet edge that is suitable for lapping after a ten or fifteen minute interval.

Presently available water soluble paints such as the acrylates overcome some of the disadvantages of the latex paints, however their use is somewhat restricted for the reason that they do not have good scrub resistance.

Paints based on the water soluble epoxy esters, according to the present invention, have excellent scrub resistance, present a satisfactory wet edge and yield high gloss enamels at high ratios of pigment to binder. Also, brushes and equipment used to apply these coatings can be cleaned with soap and water.

These water soluble epoxy esters can also be used in quick drying printing inks to produce prints having excellent water resistance. Inks based on these resins make prints comparable in quality with commercial inks containing an organic solvent without the expense and flammability hazard of organic solvents or the difficulty of cleaning equipment wetted with the ink.

According to this invention the water soluble resins are obtained by the esterification of an epoxy resin such as the diglycidyl ether of 2,2-bis(p-hydroxyphenyl)propane, i.e., the diglycidyl ether of bisphenol A, with a mixture of an aromatic carboxylic acid such as benzoic acid and a drying oil fatty acid such as linseed oil. Olefinic linkages in the fatty acid portion of the ester are then reacted with the unsaturated bond of an $\alpha,\beta$-ethylenically unsaturated carboxylic acid or anhydride such as maleic anhydride. All of the olefinic linkages are not reacted with the unsaturated acid so that the reaction product or a coating composition made from it can be dried by oxidative polymerization in the presence of metallic driers. Water solubility of the resulting adduct is then enhanced by reaction with ammonia. Thereafter a highly polar solvent such as a glycol or a polyglycol ether is added as a coupling agent to promote water miscibility. In the presence of the polar coupling agent, infinite dilution of the resin with water is possible.

The preparation of these resins can be illustrated by the following examples.

EXAMPLE 1

A stirred reactor was charged with: (1) 179 parts by weight of a polyglycidyl ether produced by the reaction of epichlorohydrin with 2,2-bis(p-hydroxyphenyl)propane in the presence of a strong base such as caustic soda, the ether having an epoxide equivalent weight of about 179; (2) 336 parts of linseed fatty acid (1.2 moles); and (3) 25 parts xylene. The reactor charge was heated slowly to 246° C., with the rate of heating being controlled to avoid excessive foaming in the reaction mixture. During this time, 6.3 parts of water were removed by azeotropic distillation. Analysis showed 90 percent of the linseed fatty acids had reacted. Thereafter the charge was cooled to less than 100° C., then 98 parts (0.8 mole) of benzoic acid were added. The reactor charge was again heated slowly to a temperature of about 266° C. with the removal of an additional 9.8 parts of water by azeotropic distillation. The reactor, which contained 595 parts by weight of resin, was further charged with 10 percent by weight of maleic anhydride and 0.1 percent iodine as a catalyst. The charge was heated to 225° and held at that temperature for five hours then cooled to about room temperature. Sufficient ammonia was added to raise the pH of the resin to about 8.0, then a quantity of ethylene glycol n-butyl ether equal to 30 percent of the resin solids was added along with sufficient water to produce a 50 percent resin solution.

A portion of this resin solution was mixed with a titanium oxide pigment in the ratio of 275 parts by weight of pigment per hundred parts resin. Sufficient water was added to reduce the solids content of 58 percent, then the slurry was ground in a ball mill for 48 hours. One percent of a cobalt paint drier was added and the resulting enamel was brushed on cardboard and Masonite panels which had been primed with latex. The 60° gloss values of the dried enamel coats were: cardboard, 80; and masonite, 70.

The resin solutions, either pigmented or unpigmented, prepared in Example 1 can be electrodeposited on anodic surfaces.

EXAMPLE 2

A stirred reactor was charged with 179 parts by weight of a polyglycidyl ether of the type employed in Example 1 along with 336 parts of soya fatty acid, 97.6 parts of benzoic acid and 43 parts of xylene. The mixture was heated to a temperature of 220° C. over a period of one hour, then gradually raised to 260° C. over the next six hours. During this period of time, 14.5 parts by weight of water were removed by azeotropic distillation.

Another stirred reactor was charged with 304.7 parts by weight of the resin prepared above along with 42.1 parts of fumaric acid and .29 part of iodine. The contents of the reactor were heated to 200° C. over a period of 25 minutes and maintained at that temperature for 14 hours. After cooling the reactor contents to 100° C., 175 parts by weight of ethylene glycol n-butyl ether were added. After further cooling to room temperature, 40 parts of concentrated ammonium hydroxide and 17 parts of water were added. The resulting material could be diluted with water in all proportions and could be used in the preparation of gloss enamels as in Example 1.

These two examples illustrate alternative procedures for preparing the epoxy esters. In Example 1 the epoxy resin was reacted first with the fatty acid, then with the benzoic acid whereas in Example 2 both acids were reacted with the epoxy resin simultaneously.

In the esterification reaction, each oxirane group of the epoxy resin provides two hydroxyl groups for esterification by the carboxyl groups of the fatty acid and benzoic or other aryl carboxylic acid. Accordingly, it is desirable to esterify the epoxy resin with fatty and aryl carboxylic acids having a combined carboxyl equivalent equal to twice the number of oxirane or epoxy equivalents.

To provide satisfactory air drying properties in the coating material, the drying oil fatty acid should supply at least 30 percent and preferably at least 45 percent of the carboxyl groups for the esterification reaction. On the other hand, it is preferable that the fatty acid supply no more than about 65 percent of the carboxyl groups to produce a coating having a satisfactory toughness and hardness. Accordingly, the ratio of equivalents of fatty acid to aromatic acid in the epoxy ester should be no more than about 1.9.

The non-drying aromatic carboxylic acid used to esterify the oxirane groups of the epoxy resin may contain up to about five carbon atoms in substituted aliphatic groups without experiencing undesirable plasticization of the coating material. Suitable aromatic acids are benzoic, toluic, tert-butyl benzoic and isopropyl benzoic acid.

As illustrated in the above examples, the esterification is desirably carried out in the presence of a water-immiscible azeotroping agent such as xylene to facilitate the removal of by-product water as the reaction proceeds. A quantity of the azeotroping agent corresponding to from about 5 to about 10 percent by weight of the epoxy resin plus acids is usually adequate.

The reaction between the epoxy ester and the $\alpha,\beta$-unsaturated acid may be carried out in the presence of a catalyst. From about 0.05 to about 0.5 weight percent iodine provides satisfactory catalysis, although the reaction can be effected non-catalytically at a slower rate. From about 5 to about 20 parts of the unsaturated acid can be reacted with one hundred parts of the epoxy ester. At the lower levels of unsaturated acid the coatings have better water resistance and flexibility whereas the higher levels produce harder, more brittle films which are faster drying, have a higher gloss and better resin solubility. Any of the low molecular weight $\alpha,\beta$-unsaturated acids or acid yielding compounds such as the anhydrides are suitable for this reaction. Among those acids which can be used are maleic, fumaric and acrylic. The anhydride of maleic acid is particularly desirable.

The carboxyl groups afforded by this unsaturated acid react readily with ammonia to impart water solubility to the epoxy ester. Although the ammoniated carboxylated esters are slightly soluble in water, they are infinitely water soluble in the presence of a highly polar coupling agent such as a glycol ether. Other suitable coupling agents are ethylene glycol, diethylene glycol, triethylene glycol, propylene glycol, dipropylene glycol, ethylene glycol methyl ether, ethylene glycol ethyl ether, ethylene glycol n-butyl ether, diethylene glycol methyl ether, diethylene glycol dimethyl ether, methyl isobutyl ketone, methyl ethyl ketone, and diethylene glycol ethyl ether.

To promote solubilization of the coupling agent with the carboxylated epoxy ester, the coupling agent is preferably mixed with the ester at a slightly elevated temperature, e.g., at about 100° C. Thereafter, the solution can be cooled to about room temperature so that the carboxyl groups can be ammoniated with concentrated ammonium hydroxide or anhydrous ammonia. This acid-base type of reaction proceeds rapidly, yielding the highly water-miscible product.

Some of the carboxyl groups of the epoxy ester can be esterified with the hydroxyl groups of the coupling agent prior to the addition of ammonium hydroxide by heating the mixture at a temperature of 125–175° C. for a period of about one to five hours. The anhydride ring, in the case of the maleic anhydride adduct of the epoxy ester, is opened under these conditions producing the half acid ester of the maleic anhydride moiety. Subsequent reaction with ammonia takes place at the residual acid group.

Numerous drying oil fatty acids may be employed in practicing this invention. Among those which may be used are linseed, soya, safflower, dehydrated castor bean, tall oil and the like.

Any of the polyepoxide resins containing more than one oxirane or vicinal group may be used in the preparation of these esters. Among the resins which can be used are those produced by reacting an epihalohydrin such as epichlorohydrin with a polyhydric phenol such as resorcinol, hydroquinone, and the polynuclear phenols such as bis(4 - hydroxyphenyl) methane, bis(4 - hydroxyphenyl) ethane, 2,2-bis(4-hydroxyphenyl) propane, 2,2-bis(4-hydroxyphenyl) butane and 1,5-dihydroxynaphthalene to produce polyepoxides having an epoxide equivalent weight up to about 250. Epoxy resins having a higher equivalent weight frequently are difficult to solubilize in the aqueous system. Also, the epoxidized cyclohexane compounds such as those described in U.S. Patents 2,890,194 through 2,890,197 and 2,917,469 may be used.

Experimental paint formulations were prepared according to this invention and applied to Masonite panels. These coated panels were then subjected to several tests to determine the utility of these materials as paints. The compositions of the resins used in the paint formulations as well as the water soluble formulations are presented in Table I. The epoxy resin used here was similar to that used in the above examples. The particular fatty acid used to produce each of the epoxy esters is indicated in the footnotes to the table. Propylene glycol methyl ether was used as the coupling agent in all of the paint formulations. Sample No. 1 also had a quantity of propylene glycol methyl ether esterified with the resin before the coupling agent and aqueous amine were added. The water solubility of the epoxy esters which had been carboxylated with the maleic anhydride was brought about by the reaction between the aliphatic amine and the carboxyl groups. The paint formulations were prepared by milling together the designated parts by weight of the water soluble epoxy ester, titanium dioxide pigment, polypropylene glycol isobutyl ether and P–1200 as an antifoaming agent. P–1200 is a polypropylene glycol having an average molecular weight in the range of 1200–1300 and a hydroxyl number of 86.4–93.5.

The aqueous amine used in these samples was a mixture containing 1.2 equivalents of ammonia and 0.3 equivalent of triethylamine. Any of the lower molecular weight amines are suitable. In addition to triethylamine, I may use morpholine, monoethanolamine, diethanolamine, propylamine and the like.

TABLE I

| Sample Number | Epoxy Ester Composition, wt. percent | | | | | W-S Resin, wt. percent | | | Paint Formulation, parts | | | |
|---|---|---|---|---|---|---|---|---|---|---|---|---|
| | Epoxy | Fatty Acid | Benzoic Acid | Maleic Anhydride | Glycol Ether | Epoxy Ester | Glycol Ether | Water-Amine | W-S Resin | TiO₂ | PIB | P-1200 |
| 1 | 23.6 | ¹41.9 | 12.2 | 11.6 | 10.7 | 80 | 5.6 | 15.4 | 71 | 350 | 61 | 7 |
| 2 | 24.6 | ¹46.9 | 13.6 | 13.1 | | 75 | 11.2 | 13.8 | 74 | 350 | 55 | 7 |
| 3 | 24.7 | ¹57.8 | 8.4 | 9.1 | | 73.1 | 15.0 | 11.9 | 75 | 350 | 66 | 7 |
| 4 | 23.5 | ¹55.4 | 8.1 | 13.0 | | 71.2 | 14.7 | 14.1 | 70 | 350 | 64 | 7 |
| 5 | 24.7 | ²57.8 | 8.4 | 9.1 | | 72.5 | 14.8 | 12.7 | 77 | 350 | 48 | 7 |
| 6 | 23.5 | ³55.4 | 8.1 | 13.0 | | 68.6 | 14.2 | 17.2 | 81 | 350 | 34 | 7 |

¹ Linseed fatty acid.  ² Soya fatty acid.  ³ Safflower fatty acid.
PIB—Propylene glycol isobutyl ether. P-1200—Polypropylene glycol.

The panels were tested for hand scrub resistance after drying in air for different lengths of time. This property was determined as the number of cycles (2 strokes/cycle) before the paint film was completely removed from the path of the stroke. A stiff hand brush and Casco soap were used in the test, with the brush being rinsed and resoaped at the end of each 50 cycles, and the direction of scrub reversed at that time. The results of these tests are given in Table II.

Using a Gardner-Multi-Angle Glossmeter, the panels were tested for 60° gloss after drying in air for 20 hours, then again after 21 days. These results are also presented in Table II.

Another property of the films reported in Table II is the color which was determined as the yellowness index on the Gardner Multi-Purpose Reflectometer according to procedures in test method 6131 Federal Specification TT-P-0029e. This was determined after five days' air drying and again after 65 days' exposure on the laboratory bench top. During this exposure, part of the panel was covered with aluminum foil so that the effect of light on color change could be determined. The lower the yellowness index, the whiter the sample.

The spotting of these coatings by water and dilute alkali was also investigated as an indication of their resistance to aqueous fluids. The painted panels were air dried for seven days, then five drops of the test fluid were placed on the surface and covered with a watch glass for four hours. The glass was then removed and the test fluid rinsed off. The tested areas were rated after one-half hour. In all instances the painted surfaces were very slightly spotted by distilled water and were only slightly discolored and swelled by 0.5 percent aqueous sodium hydroxide.

TABLE II

| Sample Number | Hand Scrub, Cycles | | | 60° Gloss | | Color—Yellowness Index | | |
|---|---|---|---|---|---|---|---|---|
| | 24 hrs. | 7 days | 21 days | 20 hrs. | 21 days | 5 Day Air Dry | 65 Days in Light | 65 Days in Dark |
| 1 | 45 | 7,500 | 7,500 | 77 | 76 | .77 | .84 | 1.38 |
| 2 | 48 | 7,500 | 7,500 | 94 | 91 | .81 | .93 | 1.45 |
| 3 | 122 | 7,500 | 7,500 | 86 | 81 | .99 | 1.00 | 1.78 |
| 4 | 33 | 7,500 | 7,500 | 88 | 87 | .84 | .91 | 1.40 |
| 5 | 62 | 7,500 | 7,500 | 80 | 77 | .75 | .89 | 1.45 |
| 6 | 40 | 7,500 | 7,500 | 88 | 85 | .59 | .85 | 1.20 |

From the foregoing, it can be seen that water soluble paint formulations prepared according to this invention produce coatings when allowed to air dry which are superior to many of the commercially available water soluble paints. Any of the solid pigments and fillers commonly used with water soluble paints generally can be added to the paint formulations of the present invention.

In addition to spray coating with these water soluble resins, a metal substrate can be coated by electrodeposition, then the coated article removed from the electrodeposition cell and baked in the same manner as sprayed coatings. A suitable method of electrodeposition is described in the article by S. R. Finn and C. C. Mell in Journal of Oil & Color Chem. Assn. 47, No. 3 (1964), pp. 219–241.

I claim:

1. A water soluble coating composition comprising: a polyepoxide resin containing more than one oxirane group per molecule and an epoxide equivalent weight less than 250 said polyepoxide resin esterified with a mixture of a drying oil fatty acid and an aromatic carboxylic acid selected from the group consisting of benzoic, toluic, tert-butyl benzoic and isopropyl benzoic acid, the sum of the carboxyl equivalents in said fatty acid and said aromatic acid mixture being substantially twice the number of oxirane equivalents in said polyepoxide resin and with the ratio of equivalents of said fatty acid to said aromatic acid in said epoxy ester being from about 0.4 to about 1.1, said epoxy ester being reacted with from 5 to about 20 percent by weight of an α,β-unsaturated carboxylic acid yielding compound under conditions wherein said α,β-unsaturated linkage reacts with unsaturated linkages in said drying oil fatty acid group, the carboxyl group thereafter having been reacted with an alkaline agent selected from the group consisting of ammonia and aliphatic amines containing from 2 to about 6 carbon atoms, said epoxy ester containing from about 10 to about 35 percent by weight of a coupling agent selected from the group consisting of water soluble glycols and glycol ethers.

2. The coating composition of claim 1 wherein said polyepoxide resin is the diglycidyl ether of 2,2-bis(4-hydroxyphenyl) propane.

3. The coating composition of claim 1 wherein said drying oil fatty acid is linseed fatty acid.

4. The coating composition of claim 1 wherein said aromatic carboxylic acid is benzoic acid.

5. The coating composition of claim 1 wherein said α,β-unsaturated acid yielding compound is maleic anhydride.

6. The coating composition of claim 1 wherein said coupling agent is propylene glycol methyl ether.

7. The method of producing a water soluble coating composition comprising:
   esterifying a polyepoxide resin having more than one oxirane group per molecule with the combination of a drying oil fatty acid and an aromatic carboxylic acid wherein the total equivalents of carboxyl groups are substantially twice the number of oxirane groups in said polyepoxide resin and the ratio of equivalents of fatty acid to aromatic acid is from about 0.4 to about 1.1;
   distilling water from said esterification mixture as the esterification reaction proceeds;
   reacting said epoxy ester with from 5 to about 20 percent by weight of an α,β-unsaturated carboxylic acid yielding compound at a temperature of at least about 200° C. and in the presence of a catalytic amount of iodine; then reacting with a sufficient amount of an alkaline agent selected from the group consisting of ammonia and aliphatic amines to obtain a pH of about 8.0; and mixing with from 10 to about 35 weight percent of a coupling agent selected from the group consisting of water soluble glycols, glycol ethers and ketones.

8. The method according to claim 7 wherein said polyepoxide resin is first esterified with said drying oil fatty acid then with said aromatic carboxylic acid.

9. The method according to claim 7 wherein said water is distilled from said esterification mixture by distillation in the presence of an azeotroping agent.

References Cited

UNITED STATES PATENTS

| | | | |
|---|---|---|---|
| 3,298,848 | 1/1967 | Wachholtz et al. | |
| 3,251,790 | 5/1966 | Christenson et al. | |
| 3,027,341 | 3/1962 | Boucher et al. | |
| 3,023,177 | 2/1962 | Boucher. | |
| 3,366,563 | 1/1968 | Hart et al. | 260—23.7 X |
| 3,305,501 | 2/1967 | Spalding | 260—18 |
| 2,809,177 | 10/1957 | Shokal | 260—18 |
| 2,668,805 | 2/1954 | Greenlee | 260—18 X |
| 3,397,159 | 8/1968 | Slater et al. | 260—18 |
| 3,355,401 | 11/1967 | Tanner | 260—18 |

FOREIGN PATENTS 962,974 7/1964 Great Britain.
407,957 3/1934 Great Britain.

OTHER REFERENCES

Alkyd Resins: Martens; Reinhold; N.Y. 1961; pp. 40, 81, 82, 83.

DONALD E. CZAJA, Primary Examiner

C. WARREN IVY, Assistant Examiner

U.S. Cl. X.R.

117—155; 204—181; 260—29.2 32.8, 33.2, 33.4